Patented Feb. 14, 1950

2,497,334

UNITED STATES PATENT OFFICE 2,497,334

PREPARATION OF THIOPHANTHRAQUINONE

Viktor Weinmayr, Pitman, N. J., assignor to E. I. du Pont de Nemours & Company, Wilmington, Del., a corporation of Delaware No Drawing. Application January 22, 1947, Serial No. 723,664

2 Claims. (Cl. 260—329)

This invention relates to an improvement in the process for the manufuaucture of thiophanthraquinone and the intermediate from which it is derived.

By thiophanthraquinone, I refer to the compound of the formula:

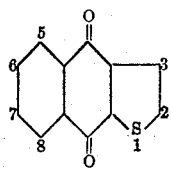

which was first prepared by W. Steinkopf, Ann. 407, 94 (1914) and originally designated by him as "thiophanthrenequinone." Since the hydrocarbon compound corresponding to this ketone was originally named "thiophanthracene" by Scholl and Seer, Ann. 394, 131 (1912), which nomenclature conforms to that used for compounds of the anthracene series, the term "thiophanthraquinone" will be employed in the present application to designate the corresponding diketone, in conformity with the nomenclature presently accepted for the corresponding anthraquinone compounds.

According to the literature, the best yield in which thiophanthraquinone was obtained from thiophene was 11%, the yield of the required intermediate (2-thenoyl)-o-benzoic acid being only 25%. That method involved the preparation and isolation of (2-thenoyl)-o-benzoic acid from phthalic anhydride, thiophene, and aluminum chloride in carbon disulfide. The keto acid thus obtained was then ring-closed to thiophanthraquinone by heating it with phosphorus pentoxide to 150° C., or in sulfuric acid to 105° C.

These procedures involve a number of undesirable features as far as the commercial production of thiophanthraquinone is concerned, such as the poor yields in all steps, the use of a highly inflammable solvent, the use of readily deliquescent phosphorus pentoxide, or, where sulfuric acid is employed, the ease with which thiophanthaquinone is sulfonated in sulfuric acid.

It is therefore an object of this invention to provide a method by which thiophanthraquinone, or the intermediate for it, (2-thenoyl)-o-benzoic acid, can readily and economically be made on any desired scale.

I have found that (2-thenoyl)-o-benzoic acid can be obtained in excellent yields if the condensation of phthalic anhydride and thiophene by means of aluminum chloride is carried out in nitrobenzene at temperatures of between 30° and 70° C. By this method, yields of over 80% of (2-thenoyl)-o-benzoic acid are obtained. Where the condensation temperature is allowed to drop below 30° C., polymerization of the thiophene becomes the predominant reaction, with a corresponding reduction in yield of the desired product.

Since thiophene polymerizes rapidly with aluminum chloride even at 0° C., one would expect that the polymerization would be even more rapid and complete at from 30° to 70° C., for ordinarily the ease with which a compound polymerizes increases with the temperature. It was therefore surprising that, at temperatures above 30° C., (2-thenoyl)-o-benzoic acid should be obtained in excellent yields.

The (2-thenoyl)-o-benzoic acid can be ring-closed to thiophanthraquinone in yields of better than 82% by heating with aluminum chloride in nitrobenzene to temperatures above 90° C.

By combining these two reactions in nitrobenzene as the reaction medium, the process can be carried out which eliminates the necessity of isolating the (2-thenoyl)-o-benzoic acid and which gives thiophanthraquinone directly in yields above 66%.

I have also found that the crude thiophanthraquinone can be readily and cheaply purified by dissolving it in sodium sulfide and precipitating it with air.

The process of this invention may therefore be carried out by condensing phthalic anhydride with thiophene in the presence of aluminum chloride and nitrobenzene at temperatures of from 45° to 55° C., then adding additional quantities of aluminum chloride and finishing the condensation at from 120° to 125° C., and finally purifying the crude product with sodium sulfide.

The following examples are given to illustrate the invention. The parts used are by weight, unless otherwise specified.

Example 1

A dry condensation vessel of steel or enamel is charged with 460 parts of dry nitrobenzene, and 208 parts of anhydrous aluminum chloride and 104.7 parts of phthalic anhydride are added. The charge is agitated for about one hour to dissolve the aluminum chloride while the temperature rises to 55° C. A solution of 59.4 parts of thiophene in 170 parts of nitrobenzene is allowed to run into the well agitated charge over a period of two hours and at a temperature of from 50° to 55° C. HCl is evolved and slight cooling is required to maintain the reaction temperature at from 50° to 55° C. The charge is agitated for two hours at from 50° to 55° C. after the addition of the thiophene is completed.

1130 parts of dry nitrobenzene and 188 parts of aluminum chloride are then added, in that order. The reaction temperature is raised over a period of from 4 to 6 hours to 120° C., and the charge is agitated for about 18 hours while the temperature is held at from 120° to 125° C.

The reaction is then complete, and the reaction mass appears as a dark red liquid. It is dropped into a vessel in which 4000 parts of cold water, containing 140 parts of sulfuric acid and 700 parts of ice, are under agitation. Using more or less of the above indicated amount of ice, the dilution temperature is allowed to rise to from 70° to 80° C. After agitating for one hour, the charge is allowed to separate into a lower solvent layer containing the thiophanthraquinone, and an upper layer containing the inorganic aluminum salts. This upper layer is drawn off to the sewer, and the solvent layer is washed several times by agitating with water and separating as before. This washing is continued until the water layer reacts only slightly acid, or is neutral. After the last wash, enough caustic is added to make the charge distinctly alkaline, and the nitrobenzene is removed by steam distillation. Crude thiophanthraquinone is obtained in the form of dark colored needles.

This crude, wet, thiophanthraquinone is slurried in 4000 parts of water containing 10 parts of caustic and 260 parts of 60% sodium sulfide crystals. The temperature is raised to 90° C. and the green solution is filtered to remove some insoluble matter. Air is then blown through the filtrate at from 75° to 90° C. until a test with lead acetate paper indicates the absence of sodium sulfide. The thiophanthraquinone is precipitated as a fine, white, crystalline product. It is filtered, washed free of alkali and dried. 100 parts of thiophanthraquinone are obtained equal to a yield of 66%, based on the thiophene. The product analyzes 99% pure and melts at from 228° to 230° C.

The melting point of a repeatedly crystallized material was determined as 230° C.

*Example 2*

1200 parts of nitrobenzene, 587 parts of aluminum chloride and 296 parts of phthalic anhydride are agitated at from 55° to 60° C. for one hour. The charge is then cooled to 40° C. and 168 parts of thiophene are gradually added at a reasonably uniform rate over a period of two hours, while the reaction temperature is held at from 40° to 45° C. One hour after the addition of thiophene is completed, the reaction temperature is raised to from 50° to 55° C. and held there for about one hour.

The dark red colored reaction mass is then poured into 11,000 parts of cold water containing 150 parts of 36% HCl. After agitating for about an hour the nitrobenzene solution of the (2-thenoyl)-o-benzoic acid is allowed to settle, the supernatant acid layer is drawn off and the nitrobenzene layer is washed with cold water until nearly acid-free. The nitrobenzene is removed by steam distillation, and the (2-thenoyl)-o-benzoic acid is filtered and washed mineral acid-free. It is then heated to 90° C. in 3000 parts of water, and enough sodium carbonate is added to make the solution alkaline. The solution is filtered and the filtrate is slowly acidified with hydrochloric acid, thereby precipitating (2-thenoyl)-o-benzoic acid.

378 parts of (2-thenoyl)-o-benzoic acid are thus obtained, equal to a yield of 81.4% of theory, based on the thiophene employed. This product is pure enough to be ring-closed to thiophanthraquinone without further purification, although it is contaminated with a small amount of a product formed by the condensation of phthalic anhydride and a polythienyl, which, in contrast to the (2-thenoyl)-o-benzoic acid, is insoluble when slurried with magnesium carbonate.

*Example 3*

100 parts of (2-thenoyl)-o-benzoic acid are added to a solution of 133 parts of aluminum chloride in 650 parts of nitrobenzene. The temperature is raised to 120° C. over a period of several hours and held at from 120° to 125° C. for about 18 hours. The resulting dark red solution is poured into water and steam distilled. The crude thiophanthraquinone is filtered off, washed acid-free with water, then washed with caustic and finally washed free of caustic with water. 84.2 parts of thiophanthraquinone are obtained, equal to a yield of 91.6%, based on the (2-thenoyl)-o-benzoic acid employed.

To purify the product it is distilled at atmospheric pressure, giving 72 parts of bright yellow thiophanthraquinone melting at 230° C., equal to a yield of 78.1%, based on the (2-thenoyl)-o-benzoic acid employed.

Numerous variations of the above procedure may be employed without departing from the spirit of the invention. The condensation temperature of the reaction leading to the preparation of the (2-thenoyl)-o-benzoic acid may vary from 30° to 70° C. Reaction temperatures below 30° C. decrease the yield considerably, and the polymerization of the thiophene becomes the predominant, and, in our case undesirable, reaction. The amount of nitrobenzene can be varied and is limited only by such practical considerations as the formation of too viscous a reaction mass if not enough is used, or the expense of recovering large amounts of solvent if too much is used. The amount of nitrobenzene used in two parts in the first example may all be used from the start. However, the use from the start of all the aluminum chloride needed in the first example tends to lower the yield for thiophanthraquinone.

It is desirable that the thiophene be added in small amounts to the aluminum chloride-phthalic anhydride solution as the reaction proceeds, so that no appreciable amount of the uncondensed thiophene is in contact with the aluminum chloride for any extended period of time. The condensation of the thiophene with the phthalic anhydride proceeds very rapidly, and further heating after the addition of all of the thiophene is not usually required.

The ring-closure of the (2-thenoyl)-o-benzoic acid to the thiophanthraquinone takes place at temperatures above 90° C. The time chosen for reaching that temperature has little significance upon the yield. The time of heating to temperatures of from 120° to 125° C. may also vary over a wide range. Ring-closure has taken place to a large extent after two hours of heating and is essentially complete after 18 hours. This time may be shortened by raising the temperature above 130° C., such as to 150° C., and will be correspondingly prolonged at temperatures below 120° C. While temperatures of up to 180° C. may be employed, such higher temperatures offer no particular advantages.

The crude thiophanthraquinone may be purified by methods used for the purification of the related anthraquinone, such as extraction with alkaline hydrosulfite, extraction with solvents, crystallization from sulfuric acid of a suitable concentration, sublimation or distillation. However, the purification with sodium sulfide, which is not applicable to anthraquinone, is particularly suitable in this process as it can be accomplished at a low cost.

The condensation of the phthalic anhydride and thiophene to produce the (2-thenoyl)-o-benzoic acid is brought about by the use of substantially the theoretical amount of aluminum chloride required to effect such a condensation, namely, two mols of $AlCl_3$ per mol of phthalic anhydride. Excesses of from 10% to 25% are usually employed to ensure complete reaction, for in many cases the aluminum chloride is not pure. Large excesses, while operable, are not essential and merely add to the cost of the process. The ring-closure of the (2-thenoyl)-o-benzoic acid is also preferably carried out with approximately two mols of aluminum chloride ($AlCl_3$), again sufficient excesses being employed to ensure complete reaction, as in the case of the condensation reaction above mentioned. Again, large excesses of the aluminum chloride in the ring-closure are not required.

It is obvious from the foregoing that the preparation of thiophanthraquinone in a good yield does not have to be carried out in one step, and that the (2-thenoyl)-o-benzoic acid may first be isolated and then ring-closed. This process provides not only a method of producing thiophanthraquinone in a good yield, but also provides a method for the preparation of (2-thenoyl)-o-benzoic acid in a good yield.

This method is not limited to thiophene alone, but can be used with substituted thiophenes such as 2-chlorothiophene, 2-methylthiophene or 3-methylthiophene, as disclosed in pending applications Serial Nos. 723,667, 723,668, and 723,669, filed simultaneously herewith.

The process of condensing phthalic anhydride with thiophene in nitrobenzene with aluminum chloride at temperatures of from 30° to 70° C. gives (2-thenoyl)-o-benzoic acid in a good yield. The ring-closure of (2-thenoyl)-o-benzoic acid in nitrobenzene by heating at from 90° to 150° C. also gives good yields of the thiophanthraquinone, and the combination of these two procedures into one process eliminates the necessity of isolating the (2-thenoyl)-o-benzoic acid. The process also provides a novel and effective method of purifying the crude thiophanthraquinone.

I claim:

1. A process for preparing thiophanthraquinone which comprises heating phthalic anhydride and thiophene in nitrobenzene and in the presence of aluminum chloride at temperatures of from 30° to 70° C., continuing the heating until the condensation is essentially complete as evidenced by substantial cessation of the evolution of hydrochloric acid gas, and effecting ring-closure of the resulting (2-thenoyl)-o-benzoic acid without isolation from the nitrobenzene by heating in the presence of aluminum chloride at temperatures of from 120° to 125° C.

2. An improvement in the process of preparing (2-thenoyl)-o-benzoic acid which comprises heating phthalic anhydride and thiophene in nitrobenzene and in the presence of aluminum chloride at temperatures of from 30° to 70° C. and continuing the heating until the condensation is essentially complete as evidenced by substantial cessation of the evolution of hydrochloric acid gas.

VIKTOR WEINMAYR.

REFERENCES CITED

The following references are of record in the file of this patent:

UNITED STATES PATENTS

| Number | Name | Date |
| --- | --- | --- |
| 1,826,621 | Lloyd | Oct. 6, 1931 |
| 1,856,231 | Stowell | May 3, 1932 |

OTHER REFERENCES

Thomas, "Anhydrous Aluminum Chloride," pages 523, 540, 541, Reinhold Pub. Co., 1941.

Calloway, "Chemical Reviews," vol. 17, pages 372, 374 (1935).